(12) United States Patent
Trani et al.

(10) Patent No.: US 10,855,741 B2
(45) Date of Patent: Dec. 1, 2020

(54) SYSTEM AND METHOD FOR MULTIPLEXED VIDEO STREAM DECODING IN WEB BROWSER

(71) Applicant: Sensormatic Electronics, LLC, Boca Raton, FL (US)

(72) Inventors: James Trani, Billerica, MA (US); Andrew Furtado, Dracut, MA (US); Teresa J. Seeley, Littleton, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 492 days.

(21) Appl. No.: 15/229,874

(22) Filed: Aug. 5, 2016

(65) Prior Publication Data
US 2017/0041364 A1 Feb. 9, 2017

Related U.S. Application Data

(60) Provisional application No. 62/202,000, filed on Aug. 6, 2015.

(51) Int. Cl.
*H04L 29/08* (2006.01)
*H04L 29/06* (2006.01)

(52) U.S. Cl.
CPC .......... *H04L 67/02* (2013.01); *H04L 65/4084* (2013.01); *H04L 65/607* (2013.01); *H04L 69/14* (2013.01); *Y02D 50/30* (2018.01)

(58) Field of Classification Search
CPC ....... H04L 67/02; H04L 65/607; H04L 69/14; H04L 65/4084
See application file for complete search history.

(56) References Cited

U.S. PATENT DOCUMENTS

| | | | | |
|---|---|---|---|---|
| 2003/0151621 A1* | 8/2003 | McEvilly | ........... | H04N 7/17318 715/744 |
| 2006/0087987 A1* | 4/2006 | Witt | .................... | H04L 63/0807 370/260 |
| 2006/0233203 A1* | 10/2006 | Iwamura | ............ | H04N 21/2368 370/516 |
| 2009/0028142 A1* | 1/2009 | Schmidt | ................. | H04N 7/173 370/389 |
| 2012/0278678 A1* | 11/2012 | Kruglick | ............... | H04L 1/0056 714/752 |
| 2013/0272374 A1* | 10/2013 | Eswaran | ............... | H04L 65/602 375/240.02 |
| 2015/0020135 A1* | 1/2015 | Frusina | .............. | H04N 21/4621 725/116 |
| 2015/0215586 A1* | 7/2015 | Lasko | .................... | H04N 7/183 348/143 |
| 2016/0119399 A1* | 4/2016 | Glass | ..................... | H04N 19/44 709/219 |

* cited by examiner

*Primary Examiner* — Moustafa M Meky
*Assistant Examiner* — Kidest Mendaye
(74) *Attorney, Agent, or Firm* — HoustonHogle LLP (57) ABSTRACT

A system and method for real time streaming and decoding of multiple simultaneous streams within a web browser is disclosed. In a preferred embodiment, a stream manager of the web browser stores decoder context data for each of the streams. The stream manager then provides the frames in conjunction with the decoder context data for consumption by a decoder of the web browser, which decodes the frames, presents the frames for display, and updates the decoder context data with the frame data of the decoded frames. In another embodiment, the stream manager is integrated within the decoder.

24 Claims, 6 Drawing Sheets

SYSTEM AND METHOD FOR MULTIPLEXED VIDEO STREAM DECODING IN WEB BROWSER

BACKGROUND OF THE INVENTION

In real time video streaming, streaming servers transmit streams over wired and/or wireless networks to client user devices. Examples of user devices include desktop computing devices and mobile computing devices such as mobile phones, tablet devices, phablets, and laptops, in examples. Because frames in streams of video data are usually much larger in size than the Maximum Transmission Unit (MTU) of the underlying network upon which the frames are sent, the streaming server first breaks up the frames into smaller pieces of frame data, and assembles the frame data into data packets. The streaming server assigns a stream ID of a stream to each data packet, and then transmits the data packets over networks to the user devices. Applications executing on the user devices receive the data packets, reassemble the frame data in the data packets into complete frames of the streams based on the stream ID of each data packet, and present the frames of the streams for display on the user device. Increasingly, the applications executing on the user device utilized for this purpose are web browsers.

The applications on the user devices that receive the streams from the streaming servers must decode the contents of the streams in order to display the streams. When a web browser is the application, the decoding of the real time video streams is typically handled by a plugin of the web browser. A plugin is an external software component that adds a specific feature to an existing software application such as a web browser.

The HTML5 specification via its <video> tag enables web browsers supporting HTML5 to handle (e.g. decode) streams natively within the web browser. This eliminates the need for external plugins to do the same. However, the <video> tag is not supported across all web browsers and does not support real-time streaming. Prior to the HTML5 specification, Motion PEG (M-JPEG or MJPEG) was used as an approximation of real time streaming within web browsers. This is a video compression format in which each video frame or interlaced field of a digital video sequence is compressed separately as a PEG image. All web browsers support the processing of MJPEG but MJPEG suffers from high bandwidth consumption.

SUMMARY OF THE INVENTION

Javascript is a programming language supported natively by web browsers. Javascript based decoders are currently available that support real time streaming of a single video stream within an HTML5 compatible web browser. However, these decoders cannot support decoding of frames from multiple simultaneous streams. This is because web browsers are single threaded applications, the nature of which prevents the use of multiple decoders within a single web browser instance.

In addition, previous decoders for browsers have decoded only one stream at a time. For this purpose, decoders maintain a history and base reference for the frames of a stream that is referred to as a "context" of the stream. When decoders consume frames for decoding, the decoder compares the current frame to the previous frame to identify changes between successive frames, where the previous frame is designated by the decoder as a "reference frame." Upon completion of decoding the current frame, the decoder includes the identified changes in the current frame, and then declares the current frame as the new reference frame for decoding of subsequent frames. Of the many different codecs available, the h.264 codec is among the most commonly used formats for the recording, compression, and distribution of video content. The h.264 codec provides quality video at substantially lower bitrates than MPEG2 and enables enhanced bandwidth management capabilities.

A system and method for real time streaming and decoding of multiple simultaneous streams within a web browser is disclosed. In a preferred embodiment, a stream manager of the web browser saves and maintains decoder context data for multiple streams, and provides frames of the streams in conjunction with the context data to a decoder of the web browser. The decoder then decodes the frames, presents the decoded frames for display on the browser, and updates the decoder context data to enable subsequent processing of additional frames of the streams. Preferably, the decoder is an h.264 decoder implemented in javascript.

In general, according to one aspect, the invention features a video streaming system. This system comprises a stream manager that creates and stores decoder context data for streams of video frame data, and buffers the frame data into frames of the frame data and a decoder that decodes the frames of the streams using the corresponding decoder context data for the one or more streams.

In examples, a streaming server, such as a network video decoder, provides the streams.

In a current implementation, the stream manager and the decoder are executing in a web browser of a user device and are implemented in javascript.

The stream manager can maintain a separate instance of the decoder context data for each of the streams. The decoder consumes the frames of the streams provided by the stream manager and multiplexes decoding of the frames of the streams using the context data. In addition, a web browser includes a client application, wherein the client application receives the decoded frames of the streams from the decoder and displays the decoded frames of the streams.

In general, according to another aspect, the invention features a method for decoding one or more streams of video frame data within a web browser. This method comprises one or more streaming servers providing the streams of frame data, wherein each of the one or more streams include frames of the frame data. The web browser then requests the one or more streams from the streaming server, creates and stores decoder context data for the one or more requested streams, presents the frames of the one or more streams and the decoder context data for the one or more streams for decoding and display, and decodes the frames of the one or more streams using the decoder context data of the one or more streams.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS in the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
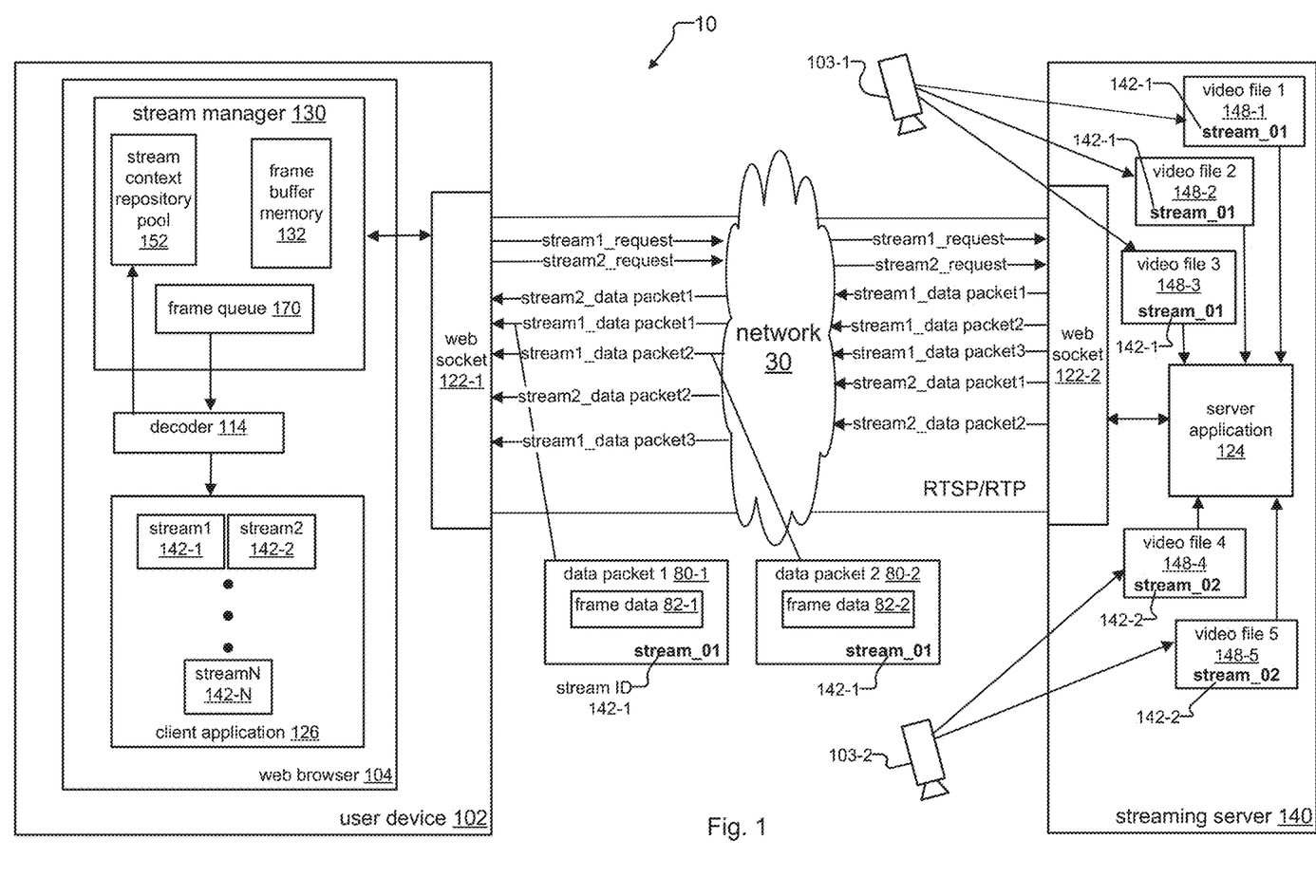
FIG. 1 is a system block diagram of a real time video streaming and decoding system, where an HTML5 compatible web browser running on a user device accepts multiple simultaneous video streams sent by a streaming server, and where the web browser includes a stream manager application ("stream manager") that enables a decoder of the web browser to support native real time streaming and decoding of frames of the multiple simultaneous video streams.

FIG. 1 shows a real time video streaming and decoding system 10. The system includes a streaming server 140 that sends frames of video ("frames") from multiple simultaneous video streams ("streams") over a network 30 to one or more user devices 102. In one example, the network 30 is or includes the internet along with possibly other networks. The streams are sent over the network 30 using data networking protocols such as IP based protocols. Typically, the protocols support data link layers such as Ethernet that support a maximum transmission unit (MTU) size of 1500 bytes.

User devices 102 include desktop computing devices and mobile computing devices such as mobile phones, tablet devices, phablets, and laptops, in examples. The user device 102 includes and executes a web browser 104. In one example, the streams are sent from the streaming server 140 in response to requests from applications other than the web browser 104 that are also executing on the user device 102. Preferably, the streaming server 140 supports the Real Time Streaming Protocol (RTSP), and the Real-time Transport Protocol (RTP).

The web browser 104 supports the HTML5 specification. The web browser 104 includes a preferred embodiment of a stream manager 130, a decoder 114, and a client application 126. The decoder 114 is preferably written in javascript. The web browser 104 and the streaming server 140 communicate information associated with streams via web sockets 122-1 and 122-2, respectively. The stream manager 130 is also preferably written in javascript in one example.

The streaming server 140 includes a server application 124 and video files 148 from video cameras 103, such as surveillance cameras. Video cameras 103-1 and 103-2 capture video data of different areas of interest, and the video data is saved as one or more video files 148 on the streaming server 140. Video camera 103-1 sends video files 1 through 3, labeled 148-1 through 148-3. Video camera 103-2 sends video files 4 and 5, labeled 148-4 and 148-5. In one example, the streaming server 140 is a network video recorder. The server application 124 of the streaming server 140 creates streams from the video files 148. Video files 1 through 3, labeled 148-1 through 148-3, are included as part of a stream having stream ID 142-1 stream_01. Video files 4 and 5, labeled 148-4 and 148-5, are included as part of a stream having stream ID 142-2 "stream_02."

The frames of the streams include frame data 82. Typically, frames are much larger in size than the MTU of the underlying transmission facility of the network 30 (e.g. 1500 bytes for IP/Ethernet). As a result, the streaming server 140 sends a succession of data packets 80 that include the frame data 82.

The stream manager 130 includes a stream context repository pool 152, frame buffer memory 132, and a frame queue 170. The client application 126 displays the frames of the streams on the web browser or other application 104 executing on the user device 102.

The stream manager 130 determines the last data packet 80 of a frame by testing if its EOF flag is set in the data packet 80. Each stream has a unique stream ID 142. Exemplary data packets 80-1 and 80-2 include frame data 82-1 and 82-2, respectively. The data packets 80-1 and 80-2 are also associated with frames of a stream having stream ID 142-1, "stream_01."

The client application 126 sends a request for new streams to the streaming server 140 via the stream manager 130. The stream manager 130, in turn, sends the requests for the new streams over the network 30 to the server application 124, labeled as "stream1_request" and "stream2_request." In response, the server application 124 sends the data packets 80 of the streams to the stream manager 130. Note that the data packets 80 of the streams can be sent out of sequence by the server application 124 and/or received out of sequence by the stream manager 130.

Figure 2:
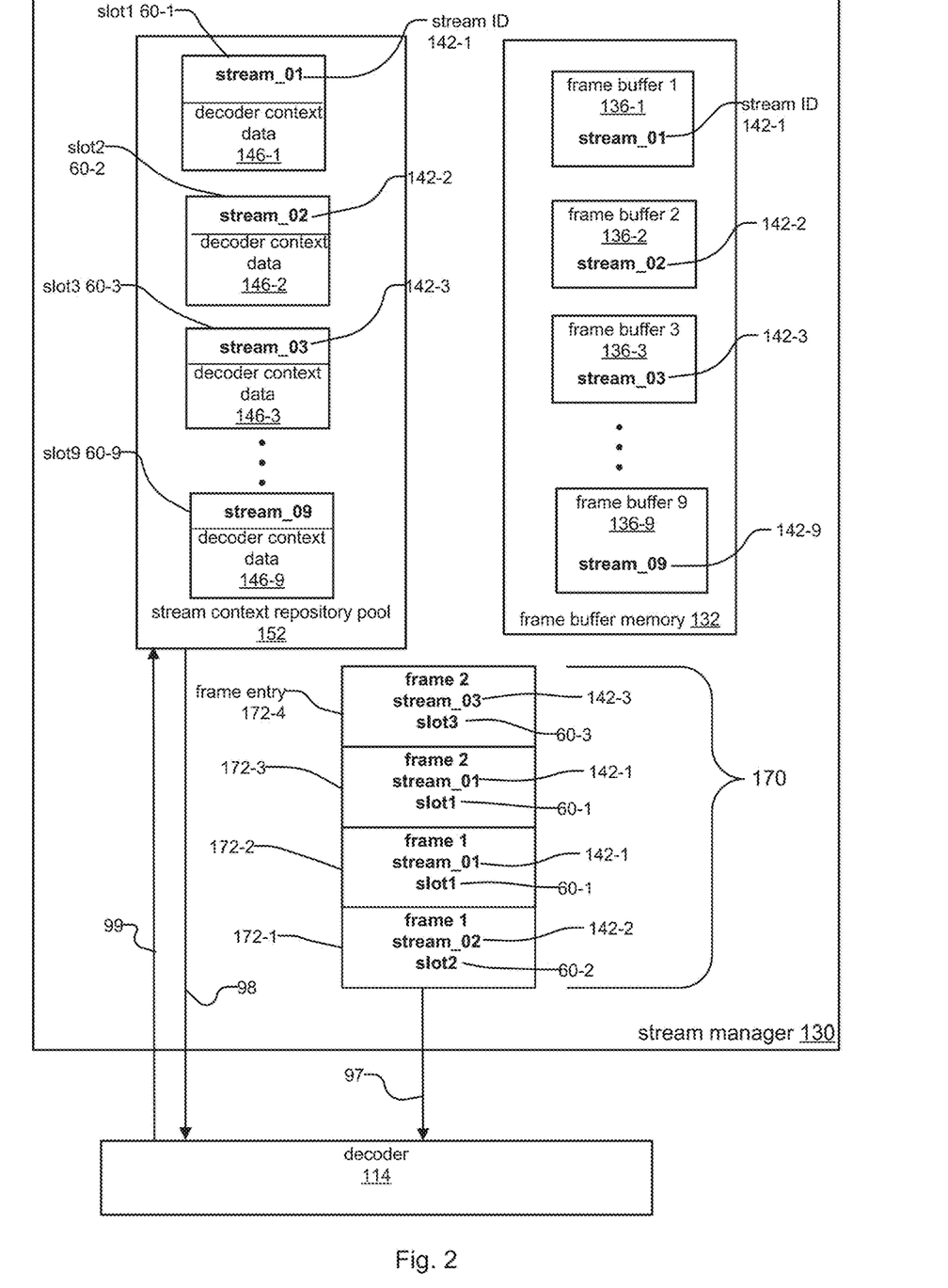
FIG. 2 is a block diagram of the stream manager, where the stream manager saves decoder context data for the frames of multiple video streams and presents the frames for consumption by the decoder.

FIG. 2 shows more detail for a preferred embodiment of the stream manager 130. The stream manager 130 presents the frames of the streams and decoder context data 146 for each of the streams to the decoder 114.

The stream context repository pool 152 includes slots 60. Each slot 60 is associated with an individual stream. Each slot also includes a separate instance of decoder context data 146 that the stream context repository pool 152 stores for each of the streams. The frame buffer memory 132 includes frame buffers 136, Preferably, the stream manager 124 supports simultaneous decoding and display of four to as many as nine simultaneous streams or more. For this purpose, the stream context repository pool 152 includes slots 1 through slot 9 labeled 60-1 through 60-9, and the frame buffer memory 132 includes frame buffers 136-1 through 136-9 to support the nine streams.

The stream manager 130 receives data packets 80 that include the frame data 82 of the frames, and places the frame data 82 into a frame buffer 136. Each frame buffer 136 holds frame data 82 for a specific stream, given by its stream ID 142. Each slot 60 of the stream context repository 152 includes decoder context data 146 and a stream ID 142 for each of the streams.

Frame queue 170 includes frame entries 172, each of which is associated with a single completed frame of the one or more streams. When the stream manager 130 receives a data packet 80 of a frame with its EOF flag set, this indicates to the stream manager 130 that the data packet 80 is the last data packet 80 of a completed frame. In response, the stream manager updates the contents of the frame buffer 136 for the stream indicated by the stream II) included in the data packet 80, and flushes the contents of the frame buffer 136 into a completed frame.

The stream manager 130 presents the completed frames for each of the streams for decoding and display by creating a separate frame entry 172 for each completed frame. Each frame entry 172 includes the completed frame, the stream ID 142 of the data packets 80 of the completed frame, and a number of a slot 60 in the stream context repository queue 152. The decoder 114 then consumes the frame entries 172 associated with each completed frame of video from the frame queue 170. Exemplary frame entries 172-1 through 174-4 are shown.

The decoder 114 consumes frames of different streams provided by the stream manager 130, and multiplexes decoding of the frames of the streams using the decoder context data 146. Frame entries 172-1 through 172-4 of the frame queue 170 show how the frames of the streams are consumed by the decoder 114 independent of the order in which the frames of the streams are received and processed by the stream manager 130. Specifically, in one implementation, the decoder 130 consumes the frame entries 172 in the frame queue 170 in a first-in-first-out (FIFO) manner. The consuming of the frame entries 172 by the decoder 114 is indicated by reference 97. For example, in the illustrated example, frame entry 172-1 includes stream ID 142-2 "stream_02" and slot 60-2 "slot2", Frame entry 172-2 includes stream ID 142-1 "stream_01" and slot 60-1 "slot1". Frame entry 172-3 includes stream ID 142-1 "stream_01" and slot 60-1 "slot1".

Upon consuming each received frame entry 172, the decoder 114 decodes the frame included within the frame entry 192. For decoding the frame, the decoder 114 accesses the associated decoder context data 146 for the stream. To accomplish this, the decoder 114 uses the slot number 60 of the frame entry 172 to lookup the decoder context data 146 having a matching slot 60 within the stream context repository pool 152. The lookup is indicated by reference 98. The decoder context data 146 maintains the "context" of the stream and includes information for decoding the frames of the stream.

Upon decoding the frame of the stream using the associated decoder context data 146 for the stream, the decoder 114 updates the "context" for decoding the stream (i.e. for decoding the next frame of the stream). This is accomplished by updating the decoder context data 146 for the stream, also using the slot number of the frame entry 172 to identify the proper instance of the decoder context data 146 for the update. This is indicated by reference 99.

It is important to note that alternative implementations of the stream manager 130 and decoder 114 are possible. While the stream manager 130 and decoder 114 preferably use a queue (e.g. the frame queue 170) to present the frames of the streams for decoding and to consume and multiplex decoding of the frames of the streams, respectively, it can be appreciated that other inter process communication techniques such as a shared memory implementation could also be used to exchange this information, in another example. In another embodiment, the stream manager 130 is integrated within the decoder 114.

Figure 3:
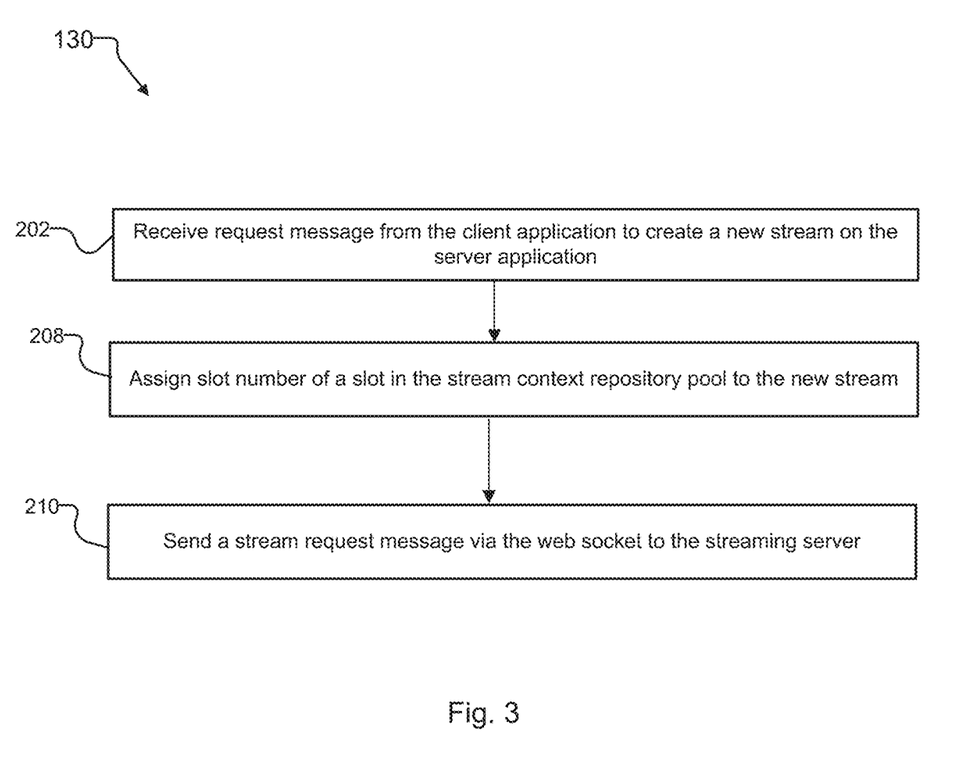
FIG. 3 is a flow diagram that shows a method of the stream manager for initial setup of video streams in accordance with principles of the stream manager, in response to requests from a client application of the web browser to create new streams on the streaming server.

FIG. 3 describes how the stream manager 130 sets up new streams in response to requests for the new streams from the client application 126.

In step 202, the stream manager 130 receives a request message from the client application 126 to create a new stream on the server application 124. According to step 208, the stream manager 130 assigns a slot number of a slot 60 in the stream context repository pool 152 to the new stream. In step 210, the stream manager 130 sends a stream request message via the web socket 122-1 to the streaming server 140.

Figure 4:
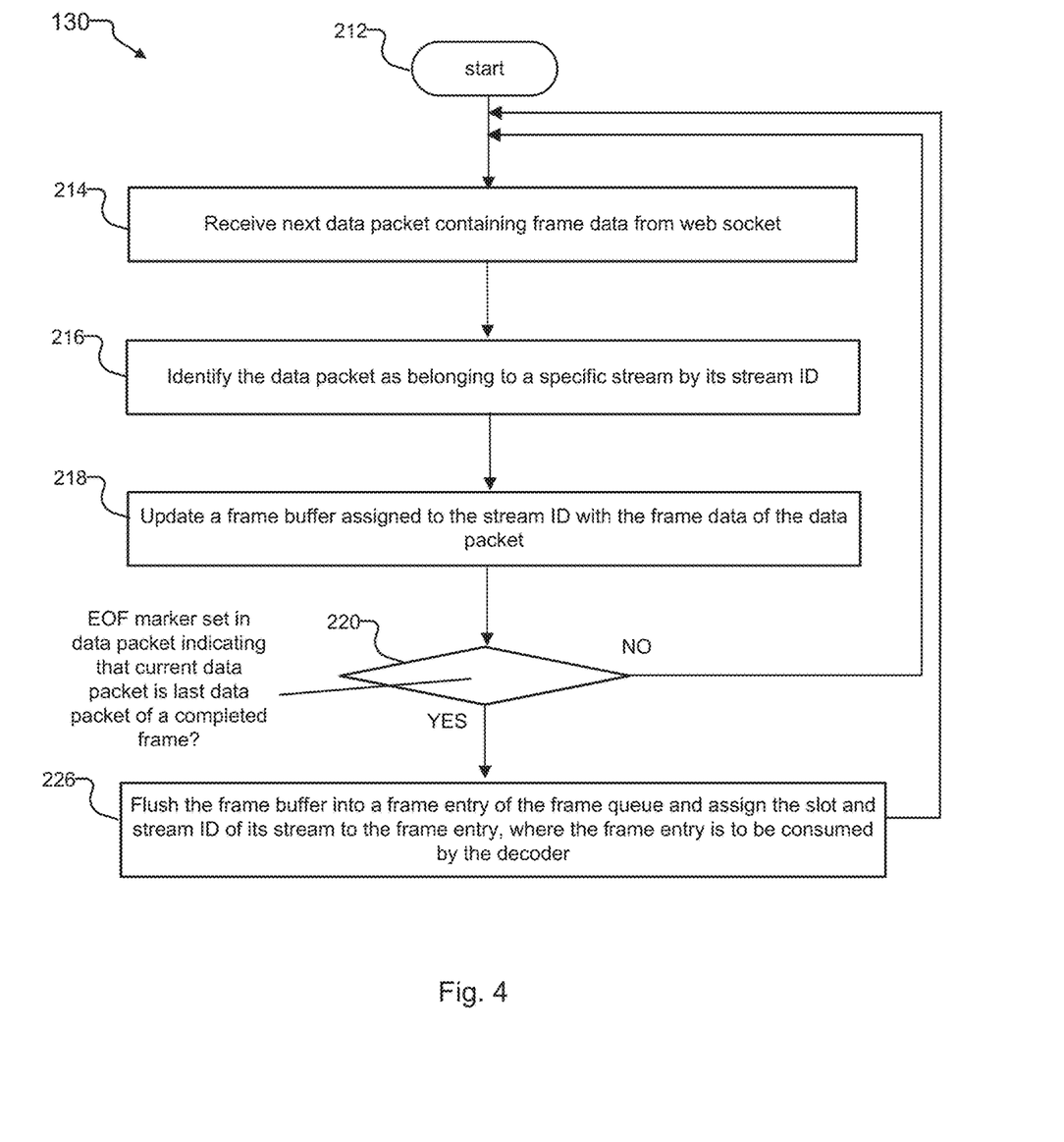
FIG. 4 is a flow chart that shows a method of the stream manager for receiving frames of multiple simultaneous video streams and presenting the frames for consumption by the decoder.

FIG. 4 describes how the stream manager 130 receives frame data 82 of frames from multiple simultaneous streams and presents completed frames for consumption by the decoder 114. The method starts in step 212.

According to step 214, the stream manager 130 receives the next data packet 80 containing frame data 82 from web socket 122-1. In step 216, the stream manager 130 identifies the data packet 80 as belonging to a specific stream by its stream ID 142. In step 218, the stream manager 130 updates a frame buffer 136 assigned to the stream ID 142 with the frame data 82 of the data packet 80.

Then, in step 220, the stream manager 130 determines if the EOF marker is set in the data packet 80, which indicates that the current data packet 80 is the last data packet 80 of a completed frame. If this resolves to true, the method transitions to step 226; otherwise the method transitions back to the beginning of step 214 to receive the next data packet 80.

In step 226, because the EOF marker was set in the data packet 80, the stream manager 130 flushes the frame buffer 136 into a frame entry 172 of the frame queue 170 and assigns the slot 60 and stream ID 142 of its stream to the frame entry 172, where the frame entry 172 is to be consumed by the decoder 114. At the conclusion of step 226, the method transitions back to the beginning of step 214 to receive the next data packet 80.

Figure 5:
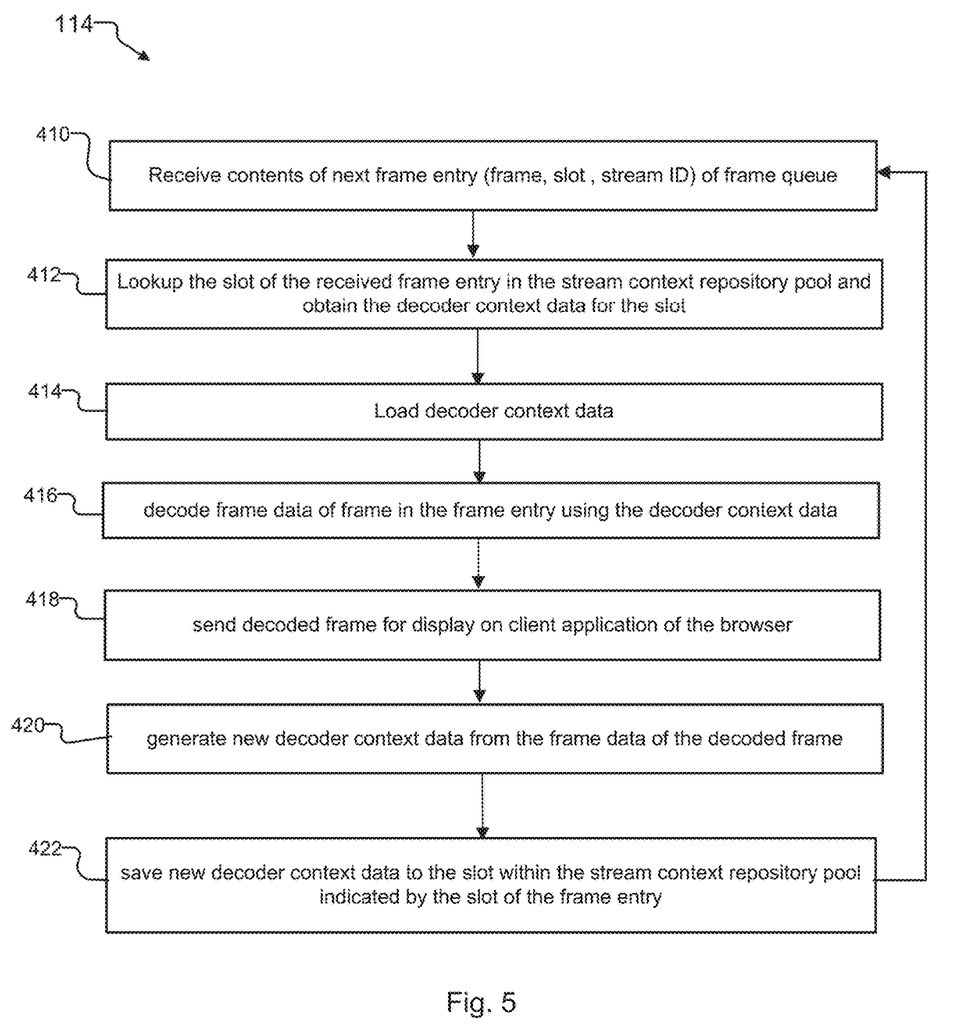
FIG. 5 is a flow chart that shows a method of operation of the decoder for decoding frames of video streams provided by the stream manager, presenting the decoded frames for display on the web browser, and updating the decoder context data of the frames of the video streams with the frame data of the decoded frames to enable the decoding and display of subsequent frames of the video streams.

FIG. 5 is a flow chart that shows a method of operation of the decoder 114.

In step 410, the decoder 114 receives contents of the next frame entry 172 (frame, slot 60, and stream ID 142) of the frame queue 170, In step 412, the decoder 114 issues a look up of the slot 60 of the received frame entry 172 in the stream context repository pool 152 and obtains the decoder context data 146 for the slot 60. In step 414, the decoder loads the decoder context data 146.

According to step 416, the decoder 114 decodes the frame data 82 of the frame in the frame entry using the decoder context data 146. In step 418, the decoder 114 sends the decoded frame for display on the client application 126 of the web browser 104. The decoder 114 generates new decoder context data 146 from the frame data 82 of the decoded frame, in step 420. Finally, in step 422, the decoder 114 saves the new decoder context data 146 to the slot 60 within the stream context repository pool 152 indicated by the slot 60 of the frame entry 172. Upon conclusion of step 422, the decoder 114 transitions to step 410 to receive the contents of the next frame entry 172 from the frame queue 170. The decoder then presents the decoded frames of the streams for display within the client application 126 of the web browser 104.

Figure 6:
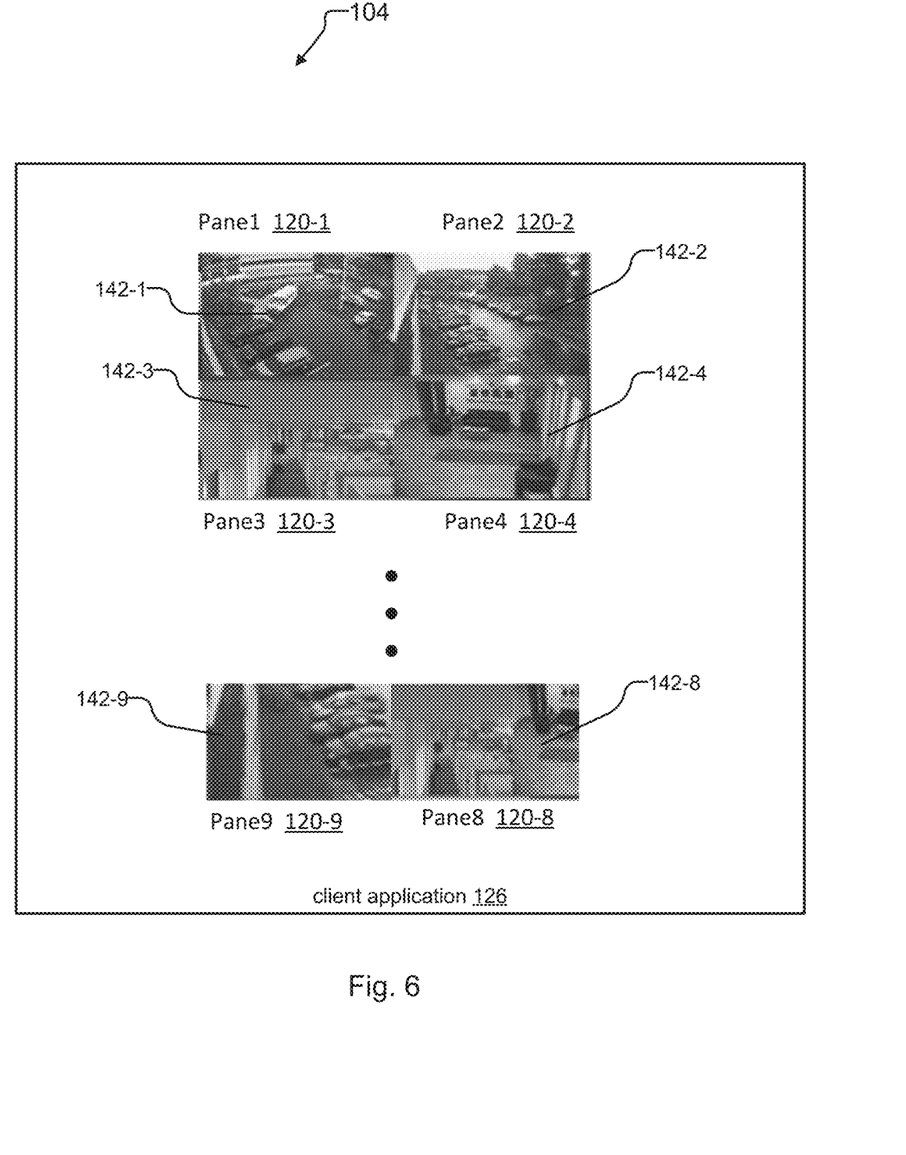
FIG. 6 is an exemplary client application of the web browser that receives the decoded frames of the multiple video streams from the decoder and displays the frames in panes of the client application, where each pane displays frames of a different video stream.

FIG. 6 shows the user interface displayed on a display area of the user device 102 by an exemplary client application 126 of the web browser 104.

The client application 126 displays decoded frames from different streams. The decoded frames are provided by the decoder 114. In one implementation, a display area of the client application 126 is divided into a grid that includes multiple panes 120. Each of the panes 120 displays decoded frames from different streams. Panel 120-1 through Pane9 120-9 display frames for streams having stream IDs 142-1 through 142-9, respectively.

The client application 126 creates an association between the panes 120 and streams according to their stream IDs 142. Upon receiving the decoded frames, the client application 116 renders the frames of the stream in the associated pane 120 for the stream.

While this invention has been particularly shown and described with references to preferred embodiments thereof, it will be understood by those skilled in the art that various changes in form and details may be made therein without departing from the scope of the invention encompassed by the appended claims.

What is claimed is:

1. A video streaming system, comprising:
   one or more user devices, wherein each of the one or more user devices executes a web browser; and
   a streaming server that provides multiple simultaneous streams of video frame data to the one or more user devices,
   wherein:
   a stream manager executing in the web browser of each of the one or more user devices that creates and stores a separate instance of decoder context data for each of the multiple simultaneous streams, buffers the frame data into completed frames, each of which is associated with one of the multiple simultaneous streams, and presents the completed frames and the decoder context data for decoding and display; and
   a decoder executing in the web browser of each of the one or more user devices decodes each of the completed frames of the multiple simultaneous streams using the instance of the decoder context data corresponding to the stream with which the completed frame being decoded is associated, and the decoder updates the instance of the decoder context data used to decode the completed frame using the decoded frame;
   wherein the decoder and the stream manager are implemented in javascript.

2. A video streaming system as claimed in claim 1, wherein the streaming server is a network video recorder.

3. A video streaming system as claimed in claim 1, wherein the stream manager is integrated within the decoder.

4. A video streaming system as claimed in claim 1, wherein the stream manager presents the frames of the streams and the decoder context data for the streams to the decoder.

5. A video streaming system as claimed in claim 1, wherein the decoder consumes the frames of the streams provided by the stream manager and multiplexes decoding of the frames of the streams using the decoder context data.

6. A video streaming system as claimed in claim 1, wherein the web browsers include client applications, wherein the client applications receive the decoded frames of the streams from the decoder and display the decoded frames of the streams.

7. The video streaming system of claim 1, wherein the stream manager includes a stream context repository pool and a frame buffer memory.

8. The video streaming system of claim 7, wherein the stream context repository pool comprises a plurality of slots, each slot being associated with one of the multiple simultaneous streams and storing the instance of the decoder context data corresponding to the stream with which the slot is associated.

9. The video streaming system of claim 8, wherein the frame buffer memory comprises frame buffers, each of which is associated with one of the multiple simultaneous streams and stores frame data received for the stream with which the frame buffer is associated.

10. The video streaming system of claim 9, wherein, in response to receiving a data packet containing stream identification information indicating one of the multiple simultaneous streams and frame data for the stream indicated by the stream identification information and having an EOF flag set indicating that the data packet is a last data packet of a completed frame, the stream manager updates contents of the frame buffer associated with the stream indicated by the stream identification information and flushes the contents of the frame buffer into a completed frame for the stream indicated by the stream identification information.

11. The video streaming system of claim 10, wherein the stream manager creates a separate frame entry for each completed frame, each frame entry including the completed frame, the stream identification information indicating the stream of the completed frame, and slot identification information indicating the slot of the stream context repository pool associated with the stream of the completed frame.

12. The video streaming system of claim 11, wherein the decoder consumes each of the frame entries and, for each consumed frame entry, decodes the completed frame included in the frame entry using the instance of the decoder context data stored by the slot indicated by the slot identification information included in the frame entry.

13. The video streaming system of claim 12, wherein, for each frame entry consumed by the decoder, upon decoding the completed frame included in the frame entry, the decoder updates the instance of the decoder context data stored by the slot indicated by the slot identification information included in the frame entry by generating new decoder context data from frame data of the decoded frame and saves the new decoder context data to the slot indicated by the slot identification information included in the frame entry.

14. The video streaming system of claim 1, wherein the stream manager supports simultaneous decoding and display of at least four to nine streams.

15. The video streaming system of claim 1, wherein, for each of the one or more user devices, a client application of the web browser executing on the user device presents a display area divided into multiple panes, each of the multiple panes being associated with a different one of the multiple simultaneous streams, the decoder provides the decoded frames from the multiple simultaneous streams to the client application, and the client application renders each of the decoded frames in the pane associated with the stream of the decoded frame.

16. The video streaming system of claim 1, wherein the decoder is an h.264 decoder implemented in javascript.

17. The video streaming system of claim 1, wherein each instance of the decoder context data includes a reference frame for decoding subsequent frames of the stream, and wherein, upon decoding a current frame of the stream, the decoder includes identified changes with respect to the reference frame in the current frame and declares the current frame as a new reference frame.

18. A method for decoding one or more streams of video frame data within a web browser executing on a user device, the method comprising;
    a streaming server providing multiple simultaneous streams of video frame data to the user device;
    a stream manager executing in the web browser and implemented in javascript creating and storing a separate instance of decoder context data for each of the multiple simultaneous streams and buffering the frame data into completed frames, each of which is associated with one of the multiple simultaneous streams;
    the stream manager presenting the completed frames and the decoder context data for decoding and display; and
    a decoder executing in the web browser and implemented in javascript decoding each of the completed frames of the multiple simultaneous streams using the instance of the decoder context data corresponding to the stream with which the completed frame being decoded is associated and updating the instance of the decoder context data used to decode the completed frame using the decoded frame.

19. The method of claim 18, further comprising the web browser displaying the decoded frames of the one or more multiple simultaneous streams.

20. The method of claim 18, wherein the stream manager presenting the completed frames and the decoder context data for the multiple simultaneous streams for decoding and display comprises:
    placing each of the completed frames of the multiple simultaneous streams in a queue; and
    for each completed frame, providing identification information indicating the separate instance of the decoder context data corresponding to the stream with which the completed frame is associated.

21. The method of claim 20, wherein the decoder decoding the completed frames of the multiple simultaneous streams using the instance of the decoder context data corresponding to the stream with which the completed frame being decoded is associated comprises:
    accessing the queue;
    removing the completed frames from the queue; and
    multiplexing decoding of the completed frames using the decoder context data by accessing the instance of the decoder context data indicated by the provided identification information for each completed frame removed from the queue.

22. The method of claim 18, wherein the streaming server providing the multiple simultaneous streams comprises including the frame data within data packets and sending the data packets over a network to the web browser in accordance with a real time streaming protocol.

23. The method of claim 18, further comprising the web browser requesting the multiple simultaneous streams from the streaming server by sending requests over a network to the streaming server in accordance with a real time streaming protocol.

24. A video streaming system, comprising:
    a streaming server that provides streams of video frame data, wherein the streaming server is a network video recorder;
    computing devices executing web browsers wherein:
        a stream manager executes in each of the web browsers that creates and stores decoder context data for streams of video frame data, and buffers the frame data into frames of the frame data; and
        a decoder executes in each of the web browsers that decodes the frames of the streams using the corresponding decoder context data for the one or more streams;
        wherein the decoder and the stream manager are implemented in javascript and the stream manager maintains a separate instance of the decoder context data for each of the streams and the decoder context data of the one or more streams is updated using the decoded frames.

* * * * *

UNITED STATES PATENT AND TRADEMARK OFFICE
CERTIFICATE OF CORRECTION

PATENT NO. : 10,855,741 B2
APPLICATION NO. : 15/229874
DATED : December 1, 2020
INVENTOR(S) : James Trani, Andrew Furtado and Teresa J. Seeley Page 1 of 1

It is certified that error appears in the above-identified patent and that said Letters Patent is hereby corrected as shown below:

In the Claims

In Claim 1, Column 7, Line 52, delete "of the one or more user devices that creates and" and insert --of the one or more user devices creates and--;

In Claim 19, Column 9, Line 44, delete "browser displaying the decoded frames of the one or more" and insert --browser displaying the decoded frames of the--.

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*